United States Patent
Lynch et al.

(10) Patent No.: US 9,374,329 B2
(45) Date of Patent: Jun. 21, 2016

(54) SAVING MESSAGE ATTACHMENTS TO AN ONLINE CONTENT MANAGEMENT SYSTEM

(71) Applicant: Dropbox, Inc., San Francisco, CA (US)

(72) Inventors: Sean Lynch, San Francisco, CA (US); Ilya Fushman, Palo Alto, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 14/632,935

(22) Filed: Feb. 26, 2015

(65) Prior Publication Data
US 2015/0172239 A1 Jun. 18, 2015

Related U.S. Application Data

(63) Continuation of application No. 13/777,256, filed on Feb. 26, 2013, now Pat. No. 9,002,962.

(60) Provisional application No. 61/735,532, filed on Dec. 10, 2012.

(51) Int. Cl.
 G06F 15/16 (2006.01)
 H04L 12/58 (2006.01)
 H04L 29/08 (2006.01)

(52) U.S. Cl.
 CPC ............. *H04L 51/08* (2013.01); *H04L 67/26* (2013.01)

(58) Field of Classification Search
 USPC ................................................ 709/206, 217
 See application file for complete search history.

(56) References Cited

U.S. PATENT DOCUMENTS

| | | | |
|---|---|---|---|
| 7,113,948 B2 | 9/2006 | Jhingan et al. | |
| 8,270,582 B1 | 9/2012 | Kirchhoff et al. | |
| 9,251,508 B2 * | 2/2016 | Bishop | G06Q 10/107 |
| 2002/0016818 A1 | 2/2002 | Kirani et al. | |

(Continued)

FOREIGN PATENT DOCUMENTS

EP 2136515 A1 12/2009

OTHER PUBLICATIONS

Rick Brioda, "Automatically save Gmail attachments to Dropbox or another cloud service", http://www.pcworld.com/article/2010355/automatically-save-gmail-attachments-to-dropbox-or-another-cloud-service.html.

(Continued)

*Primary Examiner* — Jude Jean Gilles
(74) *Attorney, Agent, or Firm* — DLA Piper LLP (US)

(57) ABSTRACT

The disclosed embodiments relate a messaging system, such as an email system, a text-messaging system or an instant-messaging system, that enables a user to save a message attachment to an online content management system (for example, to their Dropbox™). The system receives a call from a messaging system associated with the user to save a message attachment to the online content management system, wherein the call includes a link to the message attachment. In response to the call, the system commences downloading the message attachment to the online content management system. While the message attachment is downloading, the system provides a selection interface to enable the user to select a destination for the message attachment within the online content management system. After the user selects the destination and after the message attachment finishes downloading, the system saves the message attachment to the selected destination in the online content management system.

22 Claims, 2 Drawing Sheets

(56) References Cited

U.S. PATENT DOCUMENTS

| | | |
|---|---|---|
| 2002/0087704 A1 | 7/2002 | Chesnais et al. |
| 2004/0054670 A1* | 3/2004 | Noff et al. .......................... 707/3 |
| 2004/0064733 A1* | 4/2004 | Gong ............................ 713/201 |
| 2004/0068545 A1* | 4/2004 | Daniell et al. ................. 709/206 |
| 2004/0158607 A1 | 8/2004 | Coppinger et al. |
| 2006/0187931 A1 | 8/2006 | Hwang |
| 2007/0094191 A1* | 4/2007 | Wu et al. .......................... 706/46 |
| 2007/0185970 A1* | 8/2007 | Arenburg ............. G06Q 10/107 709/217 |
| 2008/0279350 A1* | 11/2008 | Skakkebaek .......... H04M 3/537 379/88.14 |
| 2009/0265279 A1* | 10/2009 | Mintz et al. ..................... 705/71 |
| 2010/0306330 A1* | 12/2010 | Friedman et al. ............. 709/206 |
| 2012/0151380 A1* | 6/2012 | Bishop ................ G06Q 10/107 715/752 |
| 2012/0254332 A1 | 10/2012 | Irvin |

OTHER PUBLICATIONS

Levi Smith, "An easy way to get email attachments into Dropbox", http://www.itsworthnoting.com/technology/an-easy-way-to-to-get-email-attachments-into-dropbox/.

* cited by examiner

SAVING MESSAGE ATTACHMENTS TO AN ONLINE CONTENT MANAGEMENT SYSTEM

RELATED APPLICATION

This application is a continuation of, and hereby claims priority under 35 U.S.C. §120 to, pending U.S. patent application Ser. No. 13/777,256 filed on 26 Feb. 2013 (referred to '256 application). This '256 application itself claims priority under 35 U.S.C. §119 to U.S. Provisional Application No. 61/735,532, entitled "Saving Email Attachments to a Cloud-Based Content Management System," filed 10 Dec. 2012.

BACKGROUND

1. Field

The disclosed embodiments generally relate to messaging systems, such as email systems, text-messaging systems or instant-messaging systems. More specifically, the disclosed embodiments relate to a messaging system that enables a user to save a message attachment to an online content management system.

2. Related Art

When a user receives a message, such as an email message or a text message, with an attachment, the user typically downloads the attachment to their computing device. However, in some situations, the user may simply want to add the attachment to their directory in a synched, online management system, such as the Dropbox service, which is offered by Dropbox, Inc. of San Francisco, Calif. To do this, the user presently has to first download the attachment to their computing device and then explicitly save it to their online content management system (e.g., their Dropbox folder). This can be a tedious process for the user. Additionally, the user may not be able to perform this process on some devices, such as mobile devices. Also, if the user is accessing the message from a shared system or a friend's system, it may be undesirable to store a copy of the attachment to the system.

SUMMARY

The disclosed embodiments relate to a feature of a messaging system that improves the user experience by allowing a user to select one or more message attachments and have them directly added to their online content management system (for example, to their Dropbox™). This feature can be integrated with the messaging-system client, even if the messaging-system client is a web-based or native client application. Moreover, a messaging-system client that incorporates this feature can reside on any type of computing device or computing system associated with the user.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Computing Environment

Figure 1:
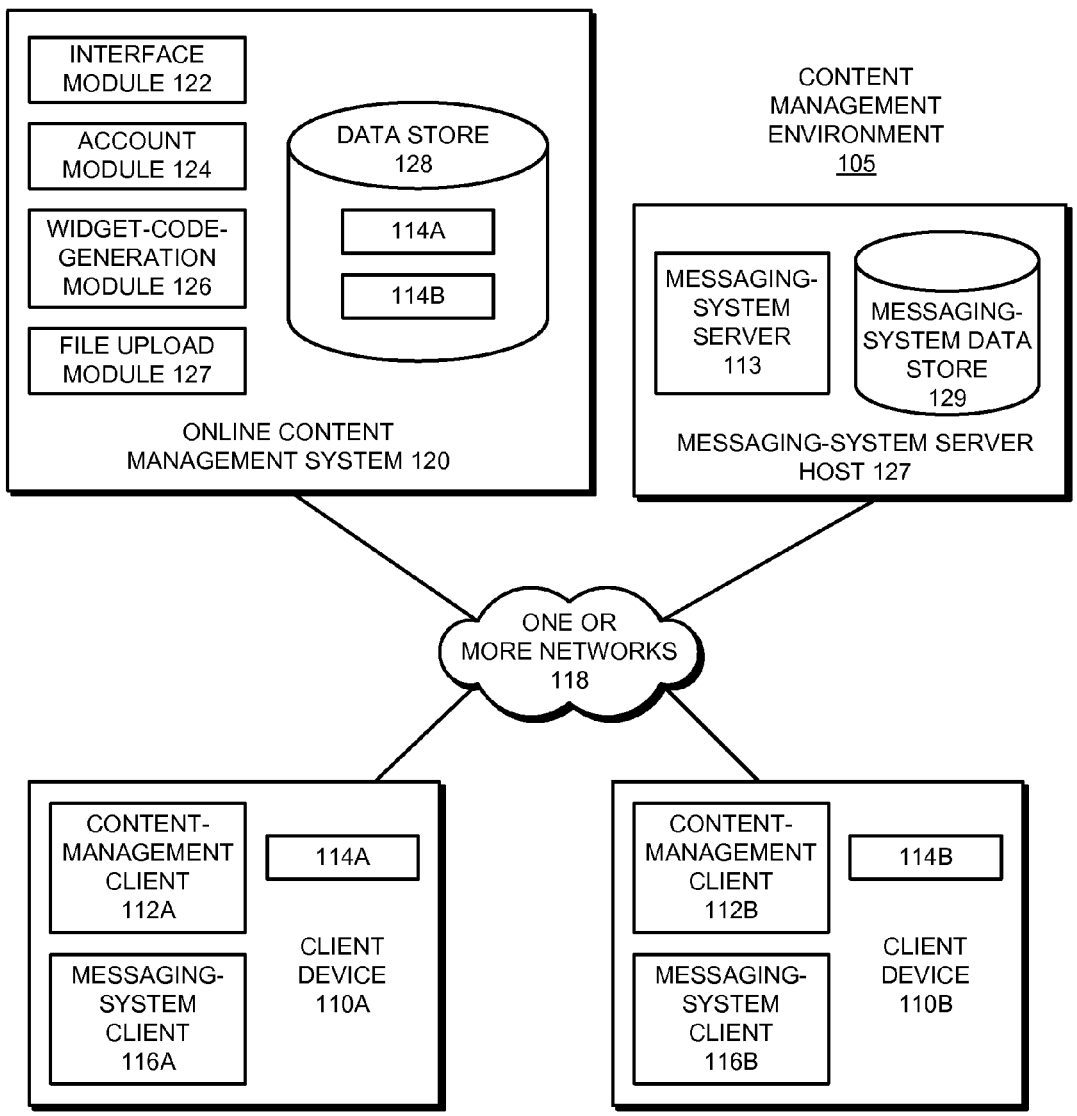
FIG. 1 shows a content management environment that includes an online content management system in accordance with the disclosed embodiments.

FIG. 1 shows content management environment 105 according to various embodiments. As may be understood from this figure, content management environment 105 includes a plurality of client devices 110A and 110B (collectively 110), a messaging-system server 113 (which resides on an messaging-system server host 127 and is associated with an messaging-system data store 129) and an online content management system 120, which are all interconnected by one or more networks 118.

Figure 2:
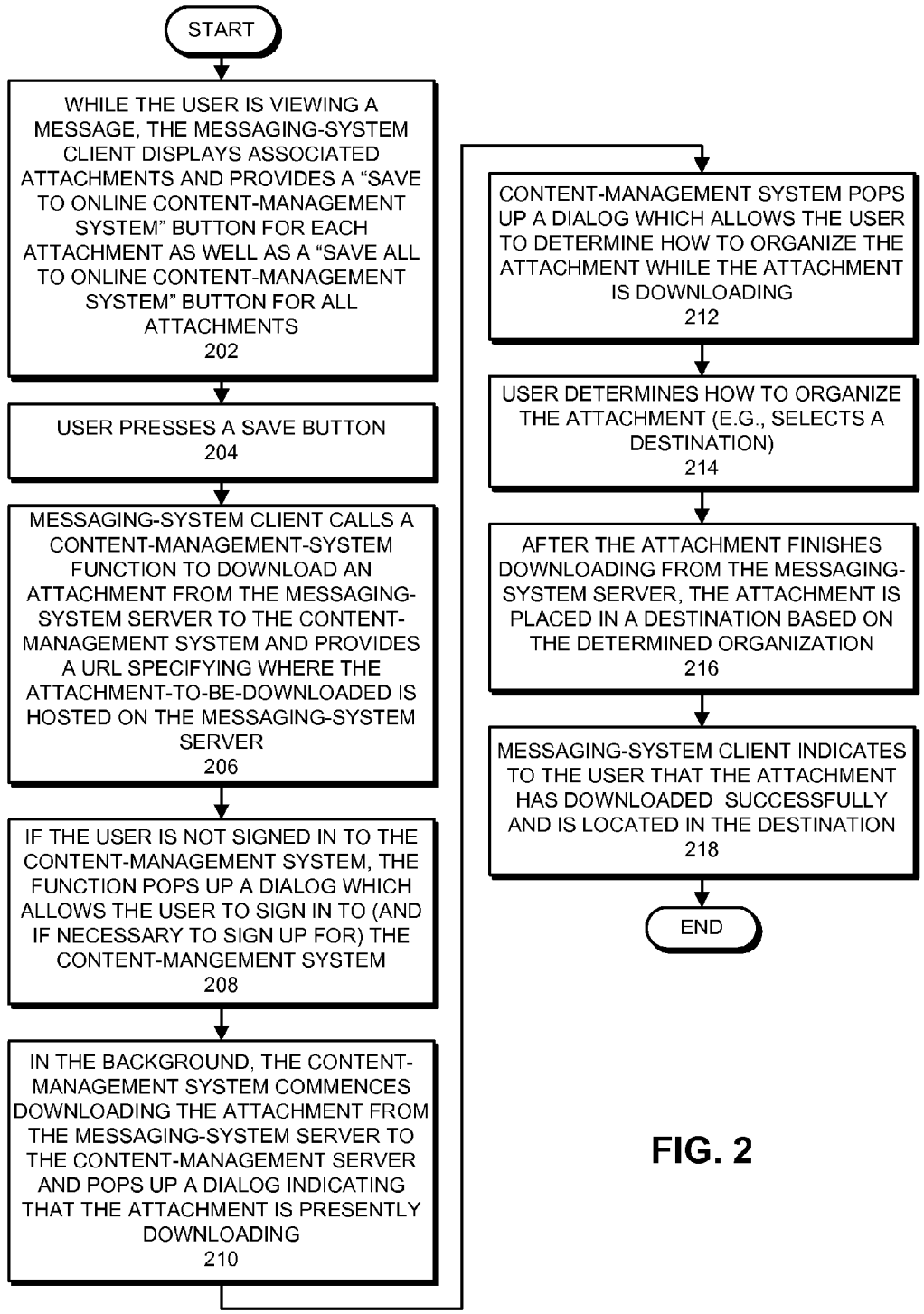
FIG. 2 presents a flow chart illustrating the message-attachment-saving process in accordance with the disclosed embodiments.

For purposes of illustration, the embodiments that appear in FIG. 1 and FIG. 2 show a messaging system comprising a messaging-system server 113 and messaging-system clients 116A-116B. Note that the described system can generally include any messaging system that can be used to communicate content items between users. For example, the described system can include an email system (or a text-messaging system) that can send content items as attachments. The described system can also include to an instant-messaging system (chat system) that can send content items between participants in an instant-messaging session.

Various aspects of the client devices 110, messaging-system server 113 and content management system 120 are discussed below.

Client Devices

In various embodiments, each client device 110A and 110B may selectively execute a respective content-management client application 112A and 112B (collectively 112) (also referred to as a "content-management client"), which may be used to manage "contents items" stored within a content management system 120, wherein a content item can include a file, folder or other data item. Note that, in some embodiments, synchronized copies of content items 114A and 114B may be kept on both content management system 120 and each respective client device 110. In some embodiments, client devices 110 may provide a file-browser type interface (not shown) for directly manipulating the content items stored on content management system 120 without maintaining a local copy. Client devices 110 may also include messaging-system clients 116A and 116B (collectively 116) for receiving and sending messages associated with messaging-system server 113. Note that these messaging-system clients 116A and 116B can be web-based or native-client-based messaging-system clients.

While only two client devices 110A and 110B are shown in FIG. 1 for purposes of clarity, it should be understood by those skilled in the relevant field that many client devices 110A and 110B may simultaneously connect through network(s) 118 to messaging-system server 113 and content management system 120 at any given time. Examples of suitable client devices 110 include, but are not limited to, a desktop computer; mobile computing devices, such as a laptop or a tablet; and handheld devices, such as a smartphone (e.g., an IPHONE®, BLACKBERRY®, or ANDROID™-based smartphone). Each client device 110 may store a local, synched copy of one or more content items from within content management system 120, and the content items may be stored in any suitable file format. When content-management client 112 presents content items that are stored within the file storage system to a user, the content items may be arranged in folders and the folders themselves may be arranged in other folders, or in any other arbitrary arrangement supported by content management system 120, as determined by the user. However, one of skill in the art should understand in light of this disclosure that each user's file storage architecture may be considerably different from the next, and in some instances, the file storage architecture may be implemented to maximize storage and file retrieval efficiency.

Content Management System

Content management system 120 stores content items and manages access to those content items via client devices 110. Content management system 120 and its components may be implemented using any appropriate hardware and software for file serving, storage, and retrieval functions. For example, content management system 120 may be implemented in the form of a single server or multiple servers.

In various embodiments, content management system 120 includes interface module 122, account module 124, widget-code-generation module 126, file upload module 127, and data store 128. Each of these elements of content management system 120 is discussed below.

Content Management System—Interface Module

In particular embodiments, interface module 122 may facilitate content item access and content item storage between content management system 120 and client devices 110. Interface module 122 may receive content items from and send content items to client devices 110 consistent with the user's preferences for sharing content items. Interface module 122 may act as the counterpart to a client-side file-explorer style user interface that allows a user to manipulate content items directly stored on content management system 120. In some embodiments, software operating on client devices 110 may integrate network-stored content items with the client's local file system to enable a user to manipulate network-stored content items through the same user interface (UI) used to manipulate content items on the local file system, e.g., via a file explorer, file finder or file browser application. As an alternative or supplement to the client-side file-explorer interface, interface module 122 may provide a web interface for client devices 110 to access (e.g., via a suitable messaging-system client 116) and allow a user to manipulate content items stored within content management system 120. In this way, the user can directly manipulate content items stored within content management system 120.

Content Management System—Data Store

In various embodiments, data store 128 may store content items such as those uploaded using client devices 110, or using any other suitable computing device. In the embodiment shown in FIG. 1, client device 110A, which is associated with a first user, is shown as locally storing at least one content item 114A, and client device 110B, which is associated with a second user, is shown as locally storing at least one content item 114B. As shown in FIG. 1, copies of the locally stored content items are maintained in data store 128 of content management system 120.

In various embodiments, data store 128 may maintain information identifying the user, information describing the user's file directory, and other information in a file journal that is maintained for each user. In some embodiments, the file journal may be maintained on content management system 120, and in other embodiments, a file journal (e.g., a "server-side file journal") may be maintained on both content management system 120 and locally on each client device 110. In various embodiments, the file journal may be used to facilitate the synchronization of the various copies of a particular content item that are associated with a user's account.

As a particular example, in the embodiment shown in FIG. 1, the system may be configured so that any changes that are made to content item 114A on particular client device 110A may also be automatically reflected in the copy of content item 114A stored within content management system 120. Similarly, any changes that are made to content item 114A on content management system 120 may also be automatically reflected in the copy of content item 114A stored on client device 110A.

Content Management System—Account Module

In particular embodiments, account module 124 may track content items stored in data store 128 and entries in the server-side file journal for each content item. As users grant file access permissions to other users, account module 124 may update the server-side file journal associated with each relevant user in data store 128. Account module 124 may also track client devices 110 that are associated with each user's account. For example, a user may want to share all their content items between their desktop computer, tablet computer, and mobile device. To make such a sharing arrangement seamless to the user, the user's single account on content management system 120 may be associated with each of the user's respective client devices. In some embodiments, an application running on each respective client device 110 may help to coordinate synchronization of content items on the client device with corresponding versions of the content items within the user's account in content management system 120, and also with corresponding versions of the content items stored on the user's various other client devices.

Content Management System—Widget-Code-Generation Module

In particular embodiments, widget-code-generation module 126 may be configured to generate code that may be used to create a message-attachment widget on a remote messaging-system client. In particular embodiments, this code may be HTML code that may be pasted into a messaging-system client to create the message-attachment widget. In other embodiments, the code may be program code that is integrated into a native-client-based messaging system. In particular embodiments, the message-attachment widget may include: (1) a button that may be used to select one or more attachments from a user's messaging-system client; and (2) code to facilitate the upload of the selected attachments directly from the messaging-system client to content management system 120. Also, in particular embodiments, the message-attachment widget may include: (1) a button that may be used to activate a content-item-selection interface to select a content item to be attached to a message; and (2) code to facilitate including a link to the selected content item in the message.

Message-Attachment-Saving Process

FIG. 2 presents a flow chart illustrating the message-attachment-saving process in accordance with the disclosed embodiments. In some embodiments, an organization that runs the online content management system provides a library of functions to programmers of the messaging-system client, wherein the library includes functions that allow a user of a messaging-system client to save a message attachment to the online content management system. For example, the programmers of the messaging system client can create a button in a user interface (UI) for the messaging-system client that says "save attachment to online content-management system," wherein pressing the button triggers a function (e.g., a JavaScript function) that saves the attachment.

More specifically, the message-attachment-saving process can operate as follows. First, while a user is viewing a message, the messaging-system client displays the associated message attachments and provides a "Save to Online Content-Management System" button for each attachment as well as a "Save All to Online Content-Management System" button for all attachments (step 202). Next, suppose the user presses a button to save one of the attachments (step 204). In this case, the messaging-system client calls a function (which can be provided by the online content management system) to save the message attachment to the online content management system (step 206).

Note that this function call can include a link such as a Universal Resource Locator (URL) to the message attachment, wherein the URL specifies where the message attachment is located on an associated messaging-system server. This allows the online content management system to download the message attachment by "pulling" the message attachment from a location specified by the URL in the messaging-system server. Alternatively, in response to the function call, the online content management system can send a temporary URL to the messaging system. This allows the messaging-system server to download the message attachment by "pushing" the message attachment to a location specified by the temporary URL in the online content management system.

A URL is a very convenient way to specify a source or a destination for a message attachment. However, in general, the system needs to communicate some type of identifier to facilitate pulling the message attachment from the messaging-system server, or pushing the message attachment to the online content management system. For example, this identifier can be some type of name (such as a filename) that can be used to identify the message attachment, or simply a numerical index that can be used to reference the message attachment. Alternatively, the identifier can specify a location for the message attachment, such as a URL, a file system pointer or a memory address.

Next, if the user is not signed in to the online content management system, the function enables the user to sign in to (and if necessary to sign up with) the online content management system. In one example, this involves popping up a dialog box with a login prompt (step 208). However, in general the function simply needs provide a mechanism that facilitates communicating identification and/or authentication information for the user to the online content management system. For example, the messaging system can automatically provide previously stored identification and authentication information for the user to the online content management system. This eliminates the need for the user to sign in. In another example, instead of popping up a dialog box, the user is temporarily redirected to a login screen for the online content management system and after the login process is complete, the user is redirected back to the messaging-system client.

Next, in the background, the online content management system commences downloading the attachment from the messaging-system server to the online content management system and also pops up a status bar indicating that the attachment is presently being downloaded (step 210). While this downloading is taking place, the online content management system can pop up a dialog box that provides a selection interface that allows the user to determine how to organize the attachment within the online content management system (step 212). The user subsequently determines how to organize the attachment, which for example can involve selecting a destination for the attachment (step 214). Note that overlapping this organization process with the downloading operation can save a significant amount of time and can improve the user's experience.

In one embodiment, the selection interface allows the user to access a website that is hosted in the online content management system. This website provides a file system view into the user's account on the online content management system and allows the user to navigate through a hierarchical directory structure. For efficiency reasons, this file system view may only list folders and not display the individual content items within the folders.

In other embodiments, instead of allowing the user to determine where to locate the attachment, the system simply maintains a "download folder" or some other type of default location for such attachments, wherein the same download folder can be used by all applications that make use of the feature. Or, alternatively each application can be associated with a different application-specific download folder. For security reasons, there might also be a separate download folder for each user, which is maintained within a directory for each user.

Finally, after the attachment finishes downloading from the messaging-system server, the attachment is placed in a destination based on the determined organization (step 216), and the messaging-system client indicates to the user that the attachment has been successfully downloaded and is located in the destination (step 218).

Note that downloading status and completion information can be provided by the online content management system to the messaging-system client as a return from the function call to save the message attachment, or alternatively through a call to a separate library function that provides status information for the attachment-saving process.

Also note that after the attachment is saved to the selected destination in the online content management system, the attachment is available for access or syncing depending on which other clients the user operates with.

The above-described message-attachment-saving process can generally be applied to any type of messaging system. In one example, the messaging system is an email system and the associated attachments are email attachments, such as documents, images, video clips or generally any type of content item. In another example, the messaging system is a text-messaging system and the associated attachments are text-message attachments, which for example, can be a content item such as a photograph.

In yet another example, the messaging system is an instant-messaging system (chat system) that can send content items between participants in an instant-messaging session. In this case, the content item is not necessarily associated with a specific message, but is instead communicated through an instant-messaging system interface that allows a content item to be selected and then communicated to a specific instant-messaging system recipient.

In another example, the messaging system can be a general non-SMS-based messaging service, such as iMessage™ system developed by Apple Inc. of Cupertino, Calif. iMessage™ was developed as an alternative to SMS/MMS messaging protocols and allows users to send texts, documents, photos and other content items over WiFi, 3G or LTE networks to other users. iMessage™ also facilitates "group chat" sessions between more than two users.

Also, the messaging system does not necessarily have to be a client-server system. In other embodiments, the messaging system is a peer-to-peer system, wherein messaging-system peers located on different computing devices communicate with each other to perform the messaging functions without having to access a centralized messaging-system server.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for enabling a client device to save a message attachment that is received by a messaging system to an online content management system, wherein the client device, the online content management system, and the messaging system are distinct, comprising:
    receiving at the client device a message, wherein the message includes an indication of the message attachment, wherein the message attachment is stored at a location in the messaging system;
    sending from the client device to the messaging system a request to store the message attachment to the online content management system;
    wherein the messaging system, in response to the request, is configured to initiate a call to the online content management system to save the message attachment to the online content management system, wherein the call specifies the location in the messaging system; and
    wherein the online content management system is configured to, in response to the call,
        determine a destination for the message attachment within the online content management system, and
        pull the message attachment from the specified location in the messaging system to the determined destination in the online content management system.

2. The method of claim 1, wherein determining the destination for the message attachment includes providing a selection interface to enable the client device to select the destination for the message attachment within the online content management system.

3. The method of claim 1,
    wherein the message attachment includes one of:
        a content item communicated as an email attachment;
        a content item communicated as a text message attachment; and
        a content item communicated through an instant-messaging session; and,
    wherein the client device receives the message but the message attachment is not downloaded to the client device.

4. The method of claim 1, wherein pulling the message attachment from the specified location in the messaging system comprises using a URL included in the call from the messaging system to the online content management system to pull the message attachment from the messaging system.

5. The method of claim 3,
    wherein the client device is configured to display a message-attachment widget received from the online content management system; and
    wherein the message-attachment widget facilitates initiating the request to the messaging system and the call to the online content management system without storing the message attachment on the client device.

6. The method of claim 1, wherein the message attachment is pulled to the online content management system from an associated messaging-system server.

7. A method for enabling a client device to save a message attachment to an online content management system, comprising:
    receiving a message for the client device at a messaging system, wherein the message includes the message attachment, wherein the message attachment is stored at a location in the messaging system, wherein the message is displayed on the client device, wherein the displayed message includes an indication of the message attachment but the message attachment is not stored on the client device;
    receiving at the messaging system a command from the client device to save the message attachment to the online content management system, wherein the command is received through a user-interface for the messaging system;
    in response to the command, making a call from the messaging system to the online content management system to save the message attachment, wherein the call specifies the location in the messaging system where the message attachment is located; and
    allowing the online content management system to pull the message attachment from the specified location in the messaging system to a destination in the online content management system.

8. The method of claim 7, wherein the specified location in the messaging system is specified using a URL included in the call.

9. The method of claim 7, wherein the call to the online content management system is made through a function associated with the messaging system, and wherein the function is provided by an entity that operates the online content management system.

10. The method of claim 7, wherein the message attachment is pulled to the online content management system from an associated messaging-system server.

11. A non-transitory computer-readable storage medium storing instructions that when executed by a computer cause the computer to perform a method for enabling a client device to save a message attachment that is received by a messaging system to an online content management system, wherein the client device, the online content management system, and the messaging system are distinct, the method comprising:

receiving at the client device a message, wherein the message includes an indication of the message attachment, wherein the message attachment is stored at a location in the messaging system;

sending from the client device to the messaging system a request to store the message attachment to the online content management system;

wherein the messaging system, in response to the request, is configured to initiate a call to the online content management system to save the message attachment to the online content management system, wherein the call specifies the location in the messaging system; and wherein the online content management system is configured to, in response to the call, determine a destination for the message attachment within the online content management system, and pull the message attachment from the specified location in the messaging system to the determined destination in the online content management system.

12. The non-transitory computer-readable storage medium of claim 11, wherein determining the destination for the message attachment includes providing a selection interface to enable the client device to select the destination for the message attachment within the online content management system.

13. The non-transitory computer-readable storage medium of claim 12, wherein the specified location in the messaging system is specified using a URL included in the function call.

14. The non-transitory computer-readable storage medium of claim 11, wherein the client device is configured to display a message-attachment widget received from the online content management system; and wherein the message-attachment widget facilitates initiating the request to the messaging system and the call to the online content management system without storing the message attachment on the client device.

15. The non-transitory computer-readable storage medium of claim 11, wherein the message attachment is pulled to the online content management system from an associated messaging-system server.

16. A non-transitory computer-readable storage medium storing instructions that when executed by a computer cause the computer to perform a method for enabling a client device to save a message attachment to an online content management system, the method comprising:

receiving a message for the client device at a messaging system, wherein the message includes the message attachment, wherein the message attachment is stored at a location in the messaging system, wherein the message is displayed on the client device, wherein the displayed message includes an indication of the message attachment but the message attachment is not stored on the client device;

receiving at the messaging system a command from the client device to save the message attachment to the online content management system, wherein the command is received from the user through a user-interface for the messaging system;

in response to the command, making a call from the messaging system to the online content management system to save the message attachment, wherein the call specifies the location in the messaging system where the message attachment is located; and allowing the online content management system to pull the message attachment from the specified location in the messaging system to a destination in the online content management system.

17. The non-transitory computer-readable storage medium of claim 16, wherein the specified location in the messaging system is specified using a URL included in the call.

18. The non-transitory computer-readable storage medium of claim 16, wherein the call to the online content management system is made through a function associated with the messaging system, and wherein the function is provided by an entity that operates the online content management system.

19. The non-transitory computer-readable storage medium of claim 16, wherein the message attachment is pulled to the online content management system from an associated messaging-system server.

20. A method for enabling a client device to save a message attachment that was received by a messaging system to an online content management system, wherein the client device, the online content management system, and the messaging system are distinct, comprising:

receiving a call at the online content management system from a messaging system to save the message attachment to the online content management system, wherein the message attachment is associated with a message that was received by the messaging system, wherein the message attachment is stored in the messaging system, wherein the received message is displayed on the client device, wherein the displayed message includes an indication of the message attachment, wherein the client device initiates the call by sending a request to the messaging system to store the message attachment to the online content management system;

in response to the call, determining a location for the message attachment within the online content management system; and sending a request to the messaging system to push the message attachment to the determined location within the online content management system.

21. The method of claim 20, wherein determining the location for the message attachment includes providing a selection interface to enable the client device to select the location for the message attachment within the online content management system.

22. A method for saving a message attachment to an online content management system, comprising:

receiving a message for a client device at a messaging system, wherein the message includes the message attachment, wherein the message attachment is stored at a location in the messaging system, wherein the message is displayed on the client device, wherein the displayed message includes an indication of the message attachment but the message attachment is not stored on the client device, wherein the client device, the online content management system, and the messaging system are distinct;

receiving at the messaging system a command from the client device to save the message attachment to the online content management system, wherein the command is received through a user-interface for the messaging system;

in response to the command, making a call from the messaging system to the online content management system to save the message attachment;

in response to the call, receiving a request from the online content management system to push the message attached to a specified location within the online content management system; and in response to the request, pushing the message attachment to the specified location within the online content management system.

* * * * *